US011724583B2

(12) United States Patent
Bergmann et al.

(10) Patent No.: US 11,724,583 B2
(45) Date of Patent: Aug. 15, 2023

(54) STRIP ASSEMBLY AND PRODUCTION METHOD

(71) Applicant: Elkamet Kunststofftechnik GmbH, Biedenkopf (DE)

(72) Inventors: Lutz Bergmann, Ehringshausen (DE); Christoph Hain, Dautphetal (DE); Marco Hain, Eschenburg (DE); David Landeck, Marburg (DE); Michael Ortmueller, Dautphetal-Herzhausen (DE); Timothee Pelichet, Schoeffengrund (DE); Hartmut Roth, Biedenkopf (DE); Marcus Schneider, Dautphetal (DE); Timo Schneider, Eschenburg (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 164 days.

(21) Appl. No.: 17/600,618

(22) PCT Filed: Sep. 29, 2020

(86) PCT No.: PCT/DE2020/100831
§ 371 (c)(1),
(2) Date: Oct. 6, 2021

(87) PCT Pub. No.: WO2021/069019
PCT Pub. Date: Apr. 15, 2021

(65) Prior Publication Data
US 2022/0144055 A1 May 12, 2022

(30) Foreign Application Priority Data
Oct. 10, 2019 (DE) .................... 10 2019 127 378.1

(51) Int. Cl.
B60J 10/70 (2016.01)
B62D 65/06 (2006.01)
B60J 1/02 (2006.01)

(52) U.S. Cl.
CPC .............. B60J 10/70 (2016.02); B62D 65/06 (2013.01); B60J 1/02 (2013.01)

(58) Field of Classification Search
CPC ..... B60J 10/70; B60J 1/02; B60J 10/15; B60J 10/34; B62D 65/06
(Continued)

(56) References Cited

U.S. PATENT DOCUMENTS 9,545,836 B2    1/2017   Silvestrini
2010/0244483 A1*  9/2010  Erner ................ B32B 17/10036
                                                                156/60

(Continued)

FOREIGN PATENT DOCUMENTS

DE    102011056955 A1 *  6/2013  ............. B60J 10/18
EP    1803610 A1    7/2007
(Continued)

Primary Examiner — Pinel E Romain
(74) Attorney, Agent, or Firm — Leydig, Voit & Mayer, Ltd.

(57) ABSTRACT

A strip assembly includes a profiled plastic strip having a latching recess configured to receive a mounting rib of an air inlet panel, and a single-piece protective plastic strip which is mechanically releasably latched in the latching recess at least in some sections along the profiled plastic strip. The strip assembly includes a first and a second strip section. The profiled plastic strip is configured such that the profiled plastic strip extends only along the first strip section. The protective plastic strip is configured such that it extends along both the first and the second strip section.

20 Claims, 4 Drawing Sheets

(58) Field of Classification Search
USPC .......................................................... 296/93
See application file for complete search history.

(56) References Cited

U.S. PATENT DOCUMENTS

2011/0047905 A1* 3/2011 Erner ..................... B60J 10/70
52/208
2019/0240820 A1 8/2019 Roth et al.

FOREIGN PATENT DOCUMENTS

| EP | 2253556 A1 | 11/2010 |
| FR | 2869257 A1 | 10/2005 |
| WO | WO 2014041279 A1 | 3/2014 |
| WO | WO 2018171972 A1 | 9/2018 |

* cited by examiner

STRIP ASSEMBLY AND PRODUCTION METHOD

CROSS-REFERENCE TO PRIOR APPLICATION

This application is a U.S. National Phase application under 35 U.S.C. § 371 of International Application No. PCT/DE2020/100831, filed on Sep. 29, 2020, and claims benefit to German Patent Application No. DE 10 2019 127 378.1, filed on Oct. 10, 2019. The International Application was published in German on Apr. 15, 2021, as WO 2021/069019 A1 under PCT Article 21(2).

FIELD

The present invention relates to a strip assembly and a production method.

BACKGROUND

Profiled plastic strips for attaching a vehicle air inlet panel to a vehicle windshield are known. Such a profiled plastic strip includes a latching recess for receiving a mounting rib of the air inlet panel, the latching recess being configured to receive the mounting rib by frictional fit and/or form fit.

During the production of the profiled plastic strip and during mounting of the profiled plastic strip to the windshield, the profiled plastic strip may be subjected to very high mechanical loads. Such loads may be, for example, bending operations for adapting the profiled plastic strip to a wide variety of windshield contours. Also, when the profiled plastic strip is pressed onto the windshield edge, very high forces may develop along the profiled plastic strip, in particular also along the latching recess. Therefore, a single-piece protective plastic strip may be provided which is mechanically releasably latchable in the latching recess and, once latched, serves to protect the latching recess.

In addition, the profiled plastic strip is often pre-attached to the windshield, especially at the windshield manufacturer's end, before the windshield is installed. Such windshield assemblies are usually transported in upright position because of their brittleness. In this connection, the profiled plastic strip may serve as a bearing edge. Due to the weight of the vehicle window pane, the profiled plastic strip, and consequently the latching recess thereof, may deform so that problems and/or leakage arise later when the air inlet panel is latched into place. In this connection, too, the protective plastic strip plays an important role for the protection of the profiled plastic strip and/or the latching recess.

Overall, the protective plastic strip allows the geometry of the cross section of the profiled plastic strip and/or of the latching recess to be protected even under the most adverse external conditions so that the air inlet panel can always be reliably, accurately and sealingly latched into the latching recess of the profiled plastic strip. However, prior to latching the air inlet panel into the latching recess, the protective plastic strip must be removed from the latching recess. The problem here is that the protective plastic strip is not ergonomic and difficult to remove from the latching recess of the profiled plastic strip because of the mechanically very stable latching connection. Therefore, the operation of removing the protective plastic strip takes varying amounts of time and, in the long run, is very tiring for the muscles of a worker's hand. The pace of the production line must be set to the worst-case duration, which overall impairs the efficiency of the assembly operation. Moreover, during removal of the protective plastic strip, it is common for damage to occur to the profiled plastic strip and neighboring vehicle components or to vehicle surfaces (e.g., the vehicle's paintwork), for example as a result of the use of unsuitable tools such as screwdrivers, pliers, or the like. Finally, there is a risk of injury to the person performing the work, for example when a fingernail breaks off during an attempt to pry the protective plastic strip out of the recess with a fingernail.

To address this, European Laid Open Application EP 2 253 556 A1 proposes to provide a protective plastic strip having a grasping tab that extends in some sections along the protective plastic strip and transversely thereto while the latter is latched in the latching recess of the profiled plastic strip. Such structures tear easily, and one has the risk of slipping off the grasping tab when grasping the same, especially when wearing gloves or under other adverse ambient conditions common in automotive manufacturing, for example, due to oily or dirty hands. A similar approach is pursued in International Laid Open Application WO2014/041279A1. Especially when a wire-type grasping loop is used for pulling out the latched protective plastic strip, this involves a high risk of injury because depending on the amount of force required, the wire-type structure may cut into the worker's skin. In addition, both approaches require substantial additional complexity and cost in the manufacture of the strip assembly and may result in that the entire strip assembly gets caught in another component during its handling (e.g., transport, assembly, storage, etc.), causing the protective plastic strip to be inadvertently and prematurely removed from the recess, or even causing the entire assembly and/or neighboring components to be deformed or damaged.

SUMMARY

In an embodiment, the present invention provides a strip assembly. The strip assembly includes a profiled plastic strip having a latching recess configured to receive a mounting rib of an air inlet panel, and a single-piece protective plastic strip which is mechanically releasably latched in the latching recess at least in some sections along the profiled plastic strip. The strip assembly includes a first and a second strip section. The profiled plastic strip is configured such that the profiled plastic strip extends only along the first strip section. The protective plastic strip is configured such that it extends along both the first and the second strip section.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
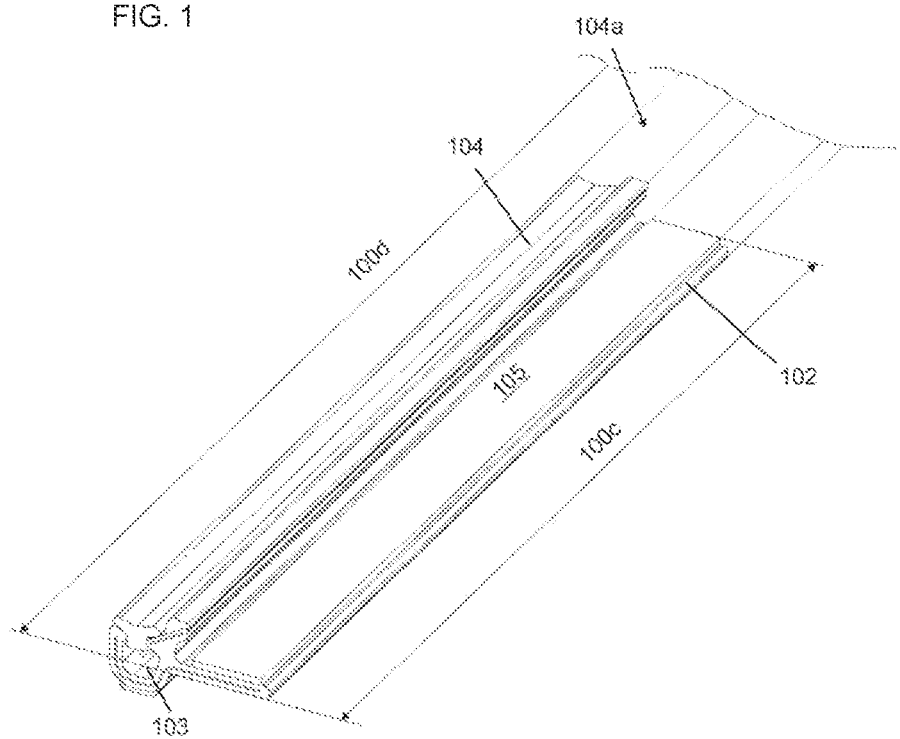
FIG. 1 shows extruded or 3D-printed strands of plastic material.

Embodiments of the present invention provide an alternative strip assembly which overcomes the described disadvantages of the prior art, and which allows the protective plastic strip to be removed from the latching recess without tools. In addition, the strip assembly is manufacturable as inexpensively as possible.

In accordance with embodiments of the present invention, there is provided a strip assembly, a method for producing a strip assembly, a windshield having the strip assembly, and a vehicle having such a windshield.

To realize the inventive strip assembly according to an embodiment of the present invention, a single-piece profiled plastic strip is provided which is preferably realized from a first extruded strand of plastic material (profiled strip strand, strand section). The profiled plastic strip includes a latching recess extending along the profiled plastic strip. To realize the strip assembly, there is further provided a single-piece protective plastic strip which is preferably realized from a second extruded strand of plastic material (protective strip strand, strand section). The cross sections of the profiled plastic strip and of the latching recess are preferably configured to correspond to each other so that a frictional and/or form-fitting releasable latching connection can be realized.

An air inlet panel having a mounting rib whose cross section substantially corresponds to the latching recess of the profiled plastic strip can preferably be mounted in the latching recess with less force than is required for its removal. This is achievable, for example, by flexible and/or projecting plastic lips which extend along the latching recess and which are preferably made by coextrusion (i.e., by merging melts of the same or different plastic materials before they exit the profile die of the extruder) and/or by latching noses within the latching recess, whose Shore hardness may preferably be less than the Shore hardness of the latching recess.

In accordance with an embodiment of the present invention, there is provided a first strip section and a second strip section, the profiled plastic strip being configured such that it extends only within the first strip section, and the protective plastic strip being configured such that it extends, preferably only, within both strip sections and is latched in the latching recess at least in some sections along preferably the entire length of the profiled plastic strip.

The two strip sections may be configured to be directly adjacent to each other so that the second strip section begins directly at the end of the first strip section and/or that the end of the first strip section coincides with the beginning of the second strip section. The second strip section may extend in space as a continuation of the longitudinal direction of the first strip section or may extend in space at an angle perpendicular to the longitudinal direction of the first strip section.

Relative to the length of the profiled plastic strip, the protective plastic strip may be implemented to have a length greater than the length of the profiled plastic strip, so that the resulting excess length of the protective plastic strip is outside the technical tolerance limits of the manufacturing process and/or is a fraction of the length of the profiled plastic strip. The excess length of the protective plastic strip may be at least dimensioned such that it can be manually grasped by a worker. The excess length may be approximately equal to the thickness of the finger of an average adult person, so that the protective plastic strip can, for example, be clamped between the index finger and thumb of the person and thus can be grasped. The surface of the protective plastic strip may be designed such that the worker does not slip off when grasping the excess length. This may be achieved, for example, by means of a roughened surface finish extending along the protective plastic strip and/or by means of a rubber coating.

Because of the leverage occurring during grasping, the forces required to manually remove the protective plastic strip from the latching recess can be readily overcome. Moreover, the strip assembly can be made from preferably extruded continuous strands without additional components and/or assembly steps.

Embodiments of the present invention allow the inner walls of the latching recess and/or the opposite edges of the latching recess to be supported relative to one another when the protective plastic strip is latched in place. This prevents the cross section of the latching recess from being deformed by external forces acting on the strip assembly along the latching recess. Thus, the strip assembly can be processed (e.g., by deformation) or fitted (e.g., by pressing it onto the edge of a windshield) or transported (e.g., pre-mounted on the edge of a windscreen) already during or immediately after its manufacture.

Embodiments of the present invention also enable the protective plastic strip to be removed manually or (partially) automatically and in minimum possible time before the air inlet panel is finally fitted into the latching recess. Thus, the latching recess is optimally protected in any conceivable spatial position or arrangement until final assembly on the vehicle. Removal of the protective plastic strip is preferably accomplished manually and entirely without tools by a worker grasping the protective plastic strip in the region of the second strip section using, for example, the index finger and thumb and pulling it out of the latching recess. This overall improves ergonomics and reduces the physical strain on the worker, because this is less tiring for the muscles of the hand. The risk of injury to the worker tends to zero because he or she is no longer tempted to remove the protective plastic strip with a fingernail, for example, and also no longer has to use sharp-edged tools. The need for auxiliary grasping means, such as wire loops or other loops, which are threaded into the strip assembly between the protective plastic strip and the latching recess, can be entirely eliminated.

In addition, assembly damage to the vehicle body and/or the latching recess is thus avoided in the best possible way. Overall, this reduces assembly costs and prevents potential complaints. This makes it possible to achieve significant cost savings in the mass production of strip assemblies and vehicles since the duration of the operation of pulling out the protective plastic strip can now be better calculated. The pace of the production line can be preset accordingly. In fact, the time required to remove the protective plastic strip from the latching recess now becomes negligible. A grasping means that can be easily grasped, for example by a robot, is now available for partially or fully automated removal of the protective plastic strip.

Advantageously, a second profiled plastic strip having a latching recess is provided such that it extends only within the second strip section, the protective plastic strip also being latched in the latching recess of this second profiled plastic strip at least in some sections. This increases the gripping surface of the projecting protective plastic strip and enhances the grip during removal of the protective plastic strip from the latching recess of the first profiled plastic strip.

It is particularly useful if the profiled plastic strip includes an engagement surface for engagement along an edge of a windshield. Further preferably, there is provided a double-sided adhesive tape including a first adhesive surface and a second adhesive surface that is covered by a preferably single-piece protective film. The adhesive tape is advantageously bonded to the engagement surface by the first adhesive surface, and the protective film of the adhesive tape preferably extends within both strip sections.

The adhesive tape's protective film may be implemented to have a length greater than the length of the profiled plastic strip, so that the resulting excess length of the adhesive tape's protective film is outside the technical tolerance limits of the manufacturing process and/or is a fraction of the length of the profiled plastic strip. The resulting excess length of the adhesive tape's protective film is at least dimensioned such that it can be manually grasped by a worker. The excess length may be approximately equal to the thickness of a finger of an average adult person, so that the adhesive tape's protective film can, for example, be clamped between the index finger and thumb of the person and thus can be grasped. Preferably, the excess length is substantially identical to the excess length of the protective plastic strip within the limits of typical manufacturing tolerances. The surface of the adhesive tape's protective film may be designed such that the worker does not slip off when grasping the excess length. This may be achieved, for example, by means of a roughened surface finish and/or by means of a rubber coating.

The engagement surface may simplify the assembly operation, for example, while the profiled plastic strip is being conformed to the edge of a windshield and/or disposed thereat. The engagement surface preferably serves as a guide while the profiled plastic strip is being conformed to the edge of the windshield as long as the adhesive tape's protective film is on the second adhesive surface. Once the profiled plastic strip has assumed the desired shape, the adhesive tape's protective film can be removed from the engagement surface just as easily and efficiently and with the same advantages as the protective plastic strip can be removed from the latching recess. It becomes even possible to remove the protective plastic strip from the profiled plastic strip together and simultaneously with the adhesive tape's protective film; i.e., within a single operation. However, it is preferred to first remove the adhesive tape's protective film, to subsequently apply the profiled plastic strip to the edge of the windshield, and to then remove the protective plastic strip from the latching recess.

Advantageously, one end of the profiled plastic strip has features of a predetermined fracture line or of a punch-cut line substantially transverse to the longitudinal extent of the profiled plastic strip. Through punching, the profiled plastic strip can be easily positioned within the specified strip sections and be implemented economically since the punching operation can be easily integrated into the production process. A predetermined fracture line allows the strip assembly to be realized later, e.g., during the assembly process on the vehicle. In the latter case, in addition to the latching recess, the protective plastic strip is therefore also protected against damage because it initially continues to be at least partially embraced and guided by both latching recesses of the two profiled plastic strips connected by the predetermined fracture line.

Further preferably, the profiled plastic strip includes a core which extends along the profiled plastic strip and is plastically deformable at least in some sections, the profiled plastic strip being arcuately curved at least in some sections and ideally pre-bent to correspond to the edge of the windshield, preferably by means of a straight and/or oblique bend. Preferably, provision is also made for spring back compensation. This makes it easier to adapt, stick, and mount the profiled plastic strip to the edge to be applied. The assembly operation is speeded up. The core of the profiled strip can be implemented as a single piece or as multiple pieces, and moreover may be implemented by means of a metal or by means of a plastic. This plastic may differ from the plastic material of the profiled strip surrounding the core in terms of Shore hardness and/or in terms of the material used. The profiled strip's core and the surrounding plastic material of the profile strip may be realized in a coextrusion process.

A windshield having an inventive strip assembly which is preferably pre-mounted on the windshield is very well suited for the spare parts business, especially for suppliers who specialize in windshield replacement. Such suppliers are supplied with windshields from a great variety of manufacturers, and sometimes these windshields have to be kept temporarily in storage. In this case, the pre-mounted strip assembly on the one hand protects the long side of the windshield during storage or transport and/or during assembly. On the other hand, the still latched protective plastic strip protects the latching recess of the profiled plastic strip from being crushed by the own weight of the windshield, which acts on the strip assembly during storage.

Once the windshield is permanently affixed to the vehicle, the projecting protective plastic strip is used by the installer as a grasping means to remove the entire protective plastic strip from the latching recess. After that, the installer can latch the mounting rib of the air inlet panel into the latching recess. Due to the above-mentioned design of the latching recess, this is readily accomplished with particular ease of assembly and with little force.

The method of embodiments of the present invention enables the inventive strip assembly to be produced particularly cost-effectively and efficiently from unitary strands which are realized using preferably extruded plastics and/or using 3D-printed plastics and which are connected to each other, e.g., by a latching connection, already during the manufacturing process. The order of the method steps is not defined by the order of the following description and may be varied within the scope of embodiments of the present invention.

An embodiment of the inventive method for producing the inventive strip assembly includes at least the steps listed below:

providing a profiled strip strand having a latching recess for receiving a mounting rib of an air inlet panel as well as a protective strip strand which is mechanically releasably latched in the latching recess at least in some sections, and dividing the profiled strip strand into two sections in a processing region, the protective strip strand remaining in one piece.

In a refinement of the method, prior to or subsequent to dividing the profiled strip strand into two sections, a strand section including the processing region is severed from the profiled strip strand and from the protective strip strand. The strand section is preferably formed by or includes the end sections of the profiled strip strand and of the protective strip strand. The strand section forms the basis of the strip assembly.

In the processing region described here with reference to the method, the division into two sections creates a boundary or a transition region between the two strip sections described with reference to the inventive strip assembly.

The division into two sections may be done prior to or subsequent to obtaining a strand section, which increases flexibility and enables application-specific customization. The division into two sections may be realized by means of a predetermined fracture line in order to split the material subsequently or after a delay. In this case, splitting would be possible only after production and before or during or after assembly. Alternatively or additionally, the division into two sections may be accomplished by means of punching or cutting, which can be easily integrated and preferably automated in the manufacturing process. In this way, a cut through the material is effected whereby an end section is severed from the profiled strip strand, which end section may optionally be removed from the profiled strip strand and the protective strip strand. The end section described here with reference to the method corresponds to or forms the second profiled plastic strip described with reference to the inventive strip assembly.

Punching is preferably performed using a profile knife which is configured to omit the protective strip strand or the protective plastic strip resulting from the protective strip strand at least in some sections, so that it remains in one piece or is at least not completely cut through. The profile knife is preferably configured to correspond to the cross section of the profiled strip strand or of the strand section or of the profiled plastic strip and preferably includes a recess for the cross section of the protective strip strand or of the protective plastic strip. Furthermore, the advantages of the inventive method correspond to the advantages described above with reference to the inventive strip assembly and the embodiments and variants mentioned in this connection. Therefore, reference is made to this preceding description also with respect to the inventive method. Further advantages and embodiments of the invention will become apparent from the following detailed description of the figures and from the underlying drawings.

It will be understood that the features mentioned and referred to hereinbefore and the features in the drawings to be commented on hereinafter may be used not only in the specified combinations, but also in other combinations not explicitly specified here or alone or in isolation without departing from the scope of the present invention. This applies particularly to all features which are shown and/or described in the various embodiments merely for the sake of completeness, but are not essential to the invention; i.e., those which are not absolutely necessary to achieve the effects of the invention.

Embodiments of the invention are illustrated in rough schematic form in the drawings with reference to the following exemplary embodiments and briefly described with reference to the drawings. Like or functionally equivalent features are given the same reference numerals unless otherwise specified.

FIG. 1 shows a single-piece profiled strip strand 100$d$ manufactured from at least one plastic material by extrusion and/or by a 3D printing process. Profiled strip strand 100$d$ includes a preferably continuous engagement surface 102 and latching recess 103. A protective strip strand 104$a$ configured to correspond to latching recess 103 is form-fittingly and/or frictionally inserted in latching recess 103. Protective strip strand 104$a$ is also made in one piece from a plastic material, preferably by extrusion or 3D printing. A double-sided adhesive tape (not visible) is bonded to engagement surface 102. The second adhesive side of the double-sided adhesive tape, which is not bonded to engagement surface 102, is covered with a protective film 105. The end sections of profiled strip strand 100$d$ and protective strip strand 104$a$ form a strand section 100$c$, which forms the basis of strip assembly 100. The strand section may be severed from profiled strip strand 100$d$ and protective strip strand 104$a$ by a punching operation and/or a cutting operation.

Plastics which can generally be used are thermoplastics and/or thermosetting plastics with and/or without fillers and/or in a wide variety of Shore hardnesses. Suitable materials include PE (polyethylene), PP (polypropylene), PA6 (polyamide 6), PA12 (polyamide 12), PA6.6 (polyamide 6.6), ABS (acrylonitrile-butadiene-styrene), PVC (polyvinyl chloride), PVC/ABS, SAN (styrene acrylonitrile), PC (polycarbonate), PMMA (polymethyl methacrylate), et cetera.

Figure 2:
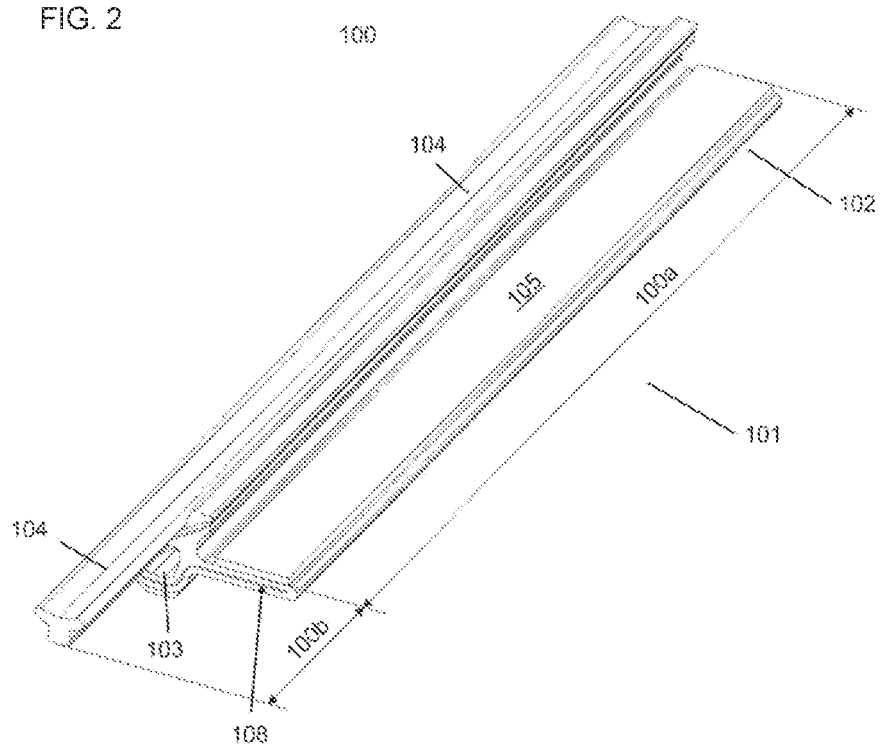
FIG. 2 shows a first strip assembly processed in accordance with an embodiment of the present invention.

FIG. 2 shows the strand section 100$c$ known from FIG. 1, which was processed in accordance with an embodiment of the present invention, forming a strip assembly 100 having a first strip section 100$a$ and a second strip section 100$b$. In this embodiment, profiled plastic strip 101, including its latching recess 103 and engagement surface 102 (most of which is hidden from view by double-sided adhesive tape 106 and its protective film 105) extends only within first strip section 100$a$ within typical manufacturing tolerances. In this embodiment, protective plastic strip 104 extends only within the two strip sections 100$a$, 100$b$ and along preferably the entire length of profiled plastic strip 101 within typical manufacturing tolerances and is form-fittingly and releasably latched in latching recess 103 at least in some sections.

In the preferred embodiment shown here, profiled plastic strip 101 extends one piece and continuously from the beginning to the end of first strip section 100$a$, and protective plastic strip 104 extends one piece and continuously from the beginning of first strip section 100$a$ to the end of second strip section 100$b$. Protective plastic strip 104 thus bridges the boundary between the two strip sections 100$a$ and 100$b$ in one piece and continuously. In the area of second strip section 100$b$, protective plastic strip 104 extends freely and/or without the guidance of a latching recess at least in some sections. Thus, in second strip section 100$b$, protective plastic strip 104 is not surrounded by the plastic material of a latching recess and/or a profiled plastic strip at least in some sections. Protective plastic strip 104 may preferably project beyond one end of profiled plastic strip 101, this projecting portion being clearly outside the technical tolerance limits of the manufacturing process, at least in such a way that the projecting portion acts as a grip portion by which protective plastic strip 104 can be preferably manually removed from the latching recess of profiled plastic strip 101.

In an advantageous refinement of this embodiment, the aforementioned double-sided adhesive tape 106 and/or the adhesive tape's protective film 105 extend(s) in one piece and continuously from the beginning of first strip section 100$a$ to the end of second strip section 100$b$. Double-sided adhesive tape 106 and/or the adhesive tape's protective film 105 thus bridge(s) the transition region (or boundary) 110 between the two strip sections 100$a$ and 100$b$ in one piece and continuously. In the area of second strip section 100$b$, double-sided adhesive tape 106 and/or the adhesive tape's protective film 105 extend(s) free of an engagement surface at least in some sections. In second strip section 100$b$, double-sided adhesive tape 106 and/or the adhesive tape's protective film 105 are/is thus not disposed on an engagement surface at least in some sections. Double-sided adhesive tape 106 and/or the adhesive tape's protective film 105 may preferably project beyond one end of profiled plastic strip 101, this projecting portion being clearly outside the technical tolerance limits of the manufacturing process, at least in such a way that the projecting portion acts as a grip portion by which the adhesive tape's protective film 105 can be removed from double-sided adhesive tape 106 along profiled plastic strip 101. Preferably, the projecting portion is also free of double-sided adhesive tape 106 and includes only the adhesive tape's protective film 105 at least in some sections. In this case, the aforementioned double-sided adhesive tape 106 extends in one piece and continuously from the beginning of first strip section 100a to the end of first strip section 100a, and the adhesive tape's protective film 105 at the same time extends in one piece and continuously from the beginning of first strip section 100a to the end of second strip section 100b. Also shown is a discontinuity 108 in the material of the profiled plastic strip at the end of first strip section 100a.

Figure 3:
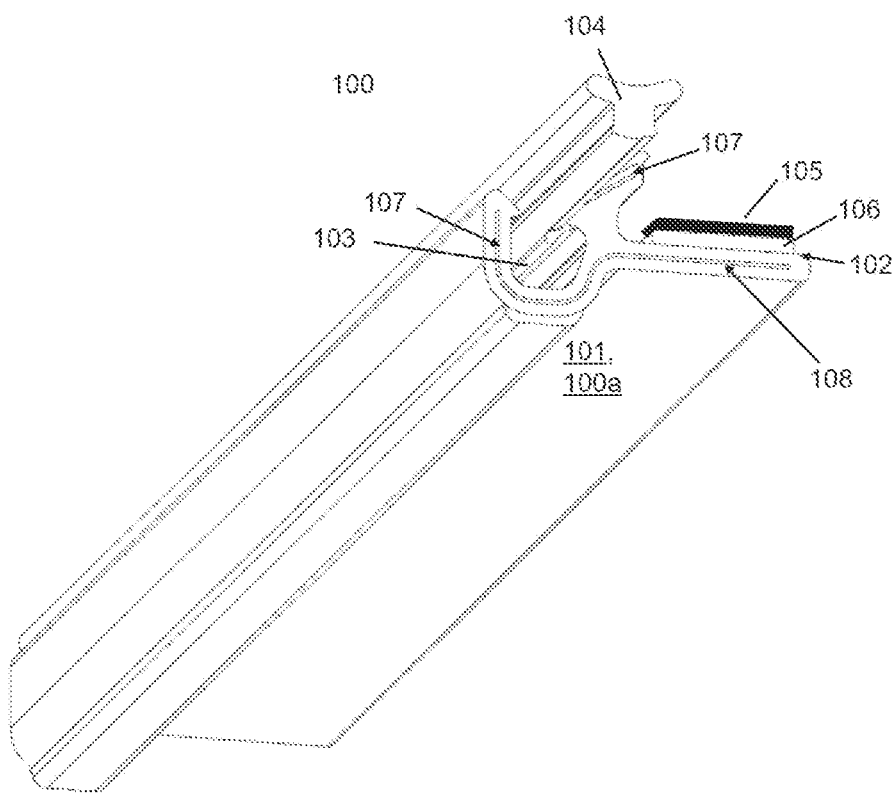
FIG. 3 shows an end portion of the processed strip assembly of FIG. 2.

FIG. 3 shows the projecting protective plastic strip 104 of the strip assembly 100 known from FIG. 2 in detail in a perspective view. Also readily seen is the strip section 100a with a profiled plastic strip 101, an engagement surface 102, a latching recess 103, with protective plastic strip 104, a double-sided adhesive tape 106, a protective film 105 of the double-sided adhesive tape, and a core 107 of the profiled strip, preferably made of metal. The profiled strip's core 107 is preferably provided additionally and may, for example, include aluminum and be implemented as multiple pieces, as shown in the figure. Latching recess 103 is approximately U-shaped in cross section and includes two preferably opposite latching hooks extending along latching recess 103 at least in some sections. Protective plastic strip 104 is approximately T-shaped in cross section and configured such that protective plastic strip 104 can be form-fittingly latched with the locking hooks at least in some sections. In FIG. 3, the assembly is shown in the latched condition. The illustrated cross-sectional area, which represents the end section of profiled plastic strip 101, may be realized by means of a predetermined fracture line 108, by means of a punch cut 108 or by means of a cut through the material 108.

Figure 4:
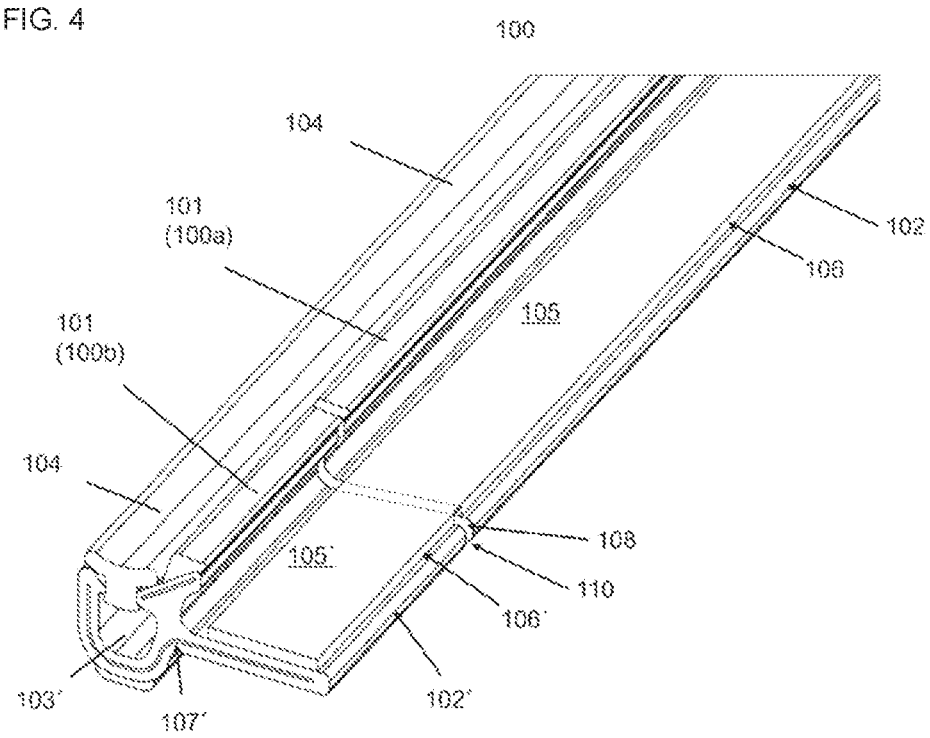
FIG. 4 shows a second strip assembly processed in accordance with an embodiment of the present invention.

FIG. 4 shows the strand section 100c known from FIG. 1 as an intermediate product, which was pre-processed in accordance with an embodiment of the present invention, forming a strip assembly 100 having a first strip section 100a and a second strip section 100b. In the preferred embodiment shown here, there is shown a (first) profiled plastic strip 101 including a latching recess 103 (not visible in the figure) and an engagement surface 102 (most of which is hidden from view by double-sided adhesive tape 106 and its protective film 105). First profiled plastic strip 101 extends only within first strip section 100a within the limits of manufacturing tolerances. The preferably similarly configured second profiled plastic strip 101', including a latching recess 103' and an engagement surface 102' (most of which is hidden from view by double-sided adhesive tape 106' and its protective film 105), extends only within second strip section 100b within the limits of manufacturing tolerances. Adhesive tape 106, 106', including its protective film 105, preferably extends and continuously and in one piece within both strip sections 100a, 100b along and over both profiled plastic strips 101, 101' and is bonded to the engagement surfaces 102, 102' of both profiled plastic strips 101, 101' at least in some sections.

Protective plastic strip 104 extends in one piece and continuously within both strip sections 100a, 100b along and over both profiled plastic strips 101, 101' and is form-fittingly and/or frictionally and releasably latched in latching recesses 103, 103' of both profiled plastic strips 101, 101' at least in some sections.

In the preferred embodiment shown here, first profiled plastic strip 101 extends in one piece and continuously from the beginning to the end of first strip section 100a. Second profiled plastic strip 101' preferably extends in one piece and continuously from the beginning to the end of second strip section 100b. Protective plastic strip 104 preferably extends in one piece and continuously from the beginning of first strip section 100a to the end of second strip section 100b. In all embodiments, transition region 110, within which the two strip sections 100a and 100b meet, is bridged by protective plastic strip 104 in one piece and continuously.

However, in the preferred embodiment shown here, as opposed to the assembly known from FIG. 2, protective plastic strip 104 does not extend freely in the area of second strip section 100b. Protective plastic strip 104 is surrounded, at least in some sections, by latching recess 103' of second profiled plastic strip 101'. This projecting assembly which is comprised of second profiled plastic strip 101', including latching recess 103', and protective plastic strip 104 and which, from the perspective of strip section 100a, is clearly outside the technical tolerance limits of the manufacturing process now acts as a grip portion by which protective plastic strip 104 can be easily manually removed along latching recess 103 of profiled plastic strip 101.

In an advantageous refinement of this embodiment, the aforementioned double-sided adhesive tape 106 and/or the adhesive tape's protective film 105 extend(s) in one piece and continuously from the beginning of first strip section 100a to the end of second strip section 100b. Double-sided adhesive tape 106, 106' and/or the adhesive tape's protective film 105 thus bridge(s) the transition 110 between the two strip sections 100a and 100b in one piece and continuously. Double-sided adhesive tape 106, 106' and/or the adhesive tape's protective film 105 thus bridge(s) the boundary between the two strip sections 100a and 100b in one piece and continuously. In contrast to the advantageous refinement mentioned with reference to FIG. 2 and the assembly shown therein, double-sided adhesive tape 106' and/or the adhesive tape's protective film 105 does not extend freely in the area of second strip section 100b. Therefore, double-sided adhesive tape 106' is bonded to engagement surface 102' of profiled plastic strip 101' at least in some sections. This projecting assembly which is comprised of second profiled plastic strip 101', including latching recess 103', and protective plastic strip 104 as well as double-sided adhesive tape 106' and the adhesive tape's protective film 105 and which, from the perspective of strip section 100a, is clearly outside the technical tolerance limits of the manufacturing process now acts as a grip portion by which protective plastic strip 104 and/or the adhesive tape's protective film 105 can be easily manually removed along latching recess 103 or engagement surface 102 of profiled plastic strip 101. Double-sided adhesive tape 106, 106' is preferably cut through in the transition region 110 between the two strip sections 100a, 100b, so that only the adhesive tape's protective film 105 remains in one piece and two sections of adhesive tape abut transition region 110. Transition region 110 may be realized by means of a predetermined fracture line 108, a punch cut 108 or a cut through the material 108. Preferably, a core 107, 107' of the profiled strip may be provided on both sides and adjacent to transition region 110 and may, for example, include aluminum and be implemented as multiple pieces and/or be provided at different positions in the cross section.

Figure 5:
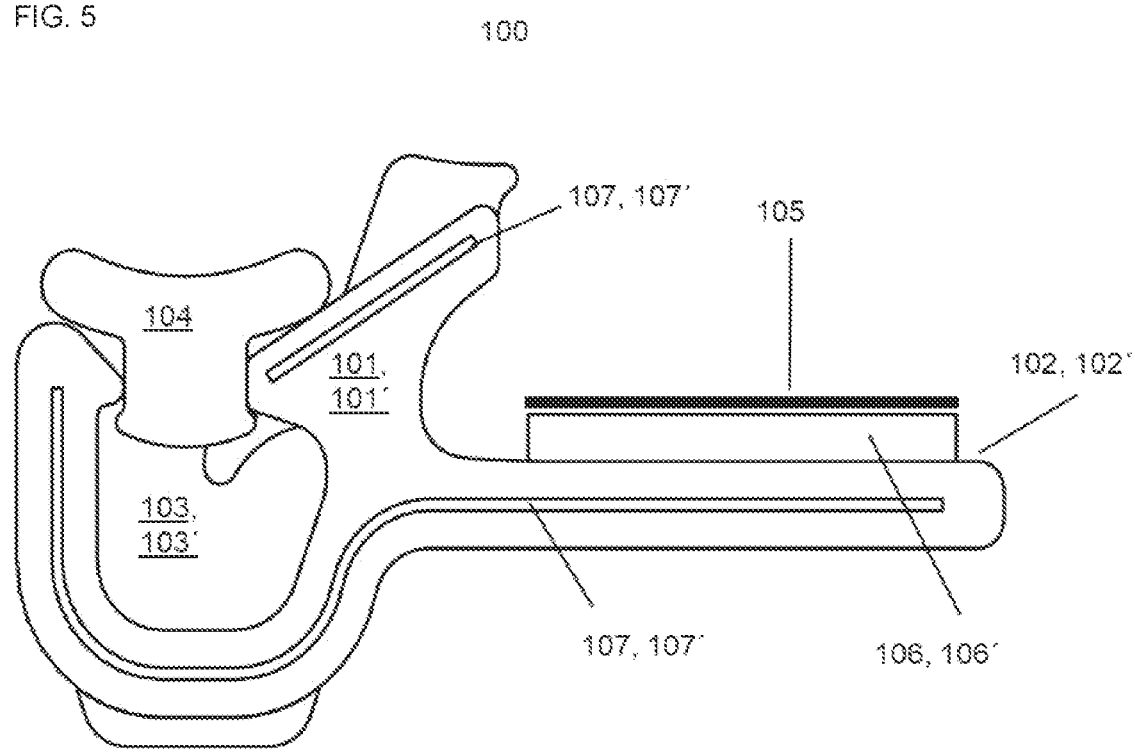
FIG. 5 shows the cross section of the strip assembly according to an embodiment of the present invention.

FIG. 5 shows strip assembly 100 in cross section. This cross section describes the cross section of strip section 100a of the strip assembly 100 shown in FIG. 2 and the cross sections of strip sections 100a and 100b of the strip assembly 100 shown in FIG. 4.

Shown in detail are the single-piece protective plastic strip 104, profiled plastic strip 101, 101', a free section of engagement surface 102, 102', latching recess 103, 103', double-sided adhesive tape 106, 106', the adhesive tape's protective film 105, and a core 107, 107' of the profiled strip. The profiled strip's core 107, 107' is preferably provided and may, for example, include aluminum and in addition be implemented as multiple pieces, as shown in the figure. Latching recess 103, 103' is approximately U-shaped in cross section and includes two preferably opposite latching hooks extending along latching recess 103, 103' at least in some sections. Protective plastic strip 104 is approximately T-shaped in cross section and configured such that protective plastic strip 104 can be form-fittingly latched with the locking hooks at least in some sections. In FIG. 5, the latched condition is illustrated.

Figure 6:
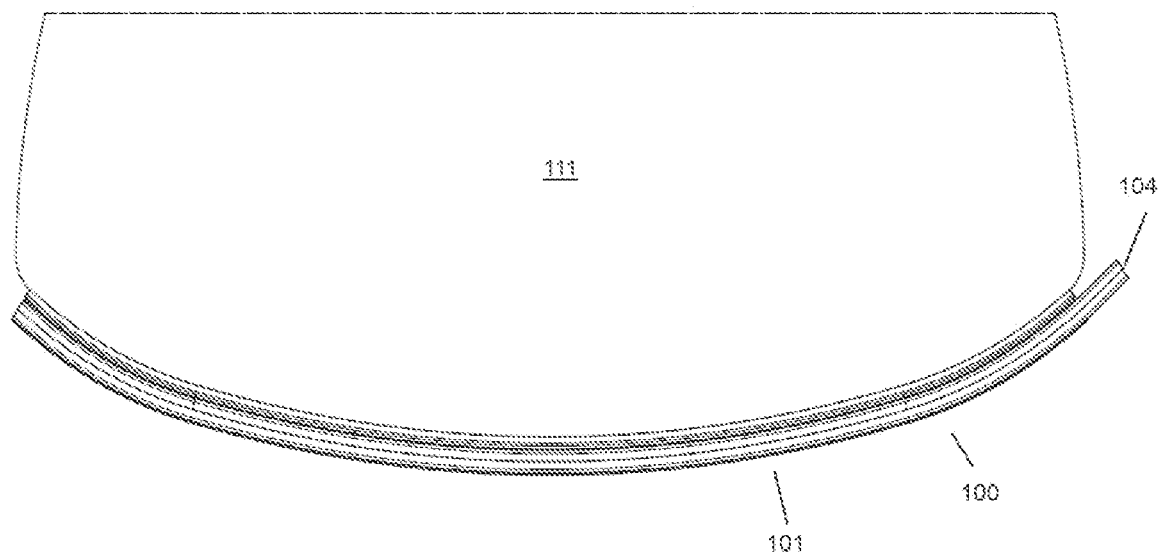
FIG. 6 shows a windshield with the strip assembly according to an embodiment of the present invention.

FIG. 6 shows a windshield with an inventive strip assembly 100 as shown in FIG. 2. Any of the described and/or claimed embodiments of strip assemblies 100 may be used alternatively. In this embodiment, the inventive strip assembly 100 is already adhesively attached along the bottom edge of the windshield by means of double-sided adhesive tape 106 (hidden from view by the edge of the windshield). In this figure, protective plastic strip 104 projects at the right side as a grasping means for removing protective plastic strip 104. Alternatively, protective plastic strip 104 could project at the left side as a grasping means for removing protective plastic strip 104. Further alternatively, protective plastic strip 104 could project at both sides as a grasping means for removing protective plastic strip 104.

In order to install an air inlet panel, initially, windshield 111 is mounted, together with the inventive strip assembly 100, at an opening in the vehicle body, e.g., to a windshield flange of the A-pillar of a motor vehicle. Then, in accordance with an embodiment of the present invention, protective plastic strip 104 is removed from latching recess 103 of profiled plastic strip 101 (hidden from view by protective plastic strip 104 in the figure) before the mounting rib of the air inlet panel is latched into latching recess 103.

Also, an assembly kit including at least a windshield 111 and an inventive strip assembly 100 not yet mounted may be provided for the spare parts business.

Figure 7:
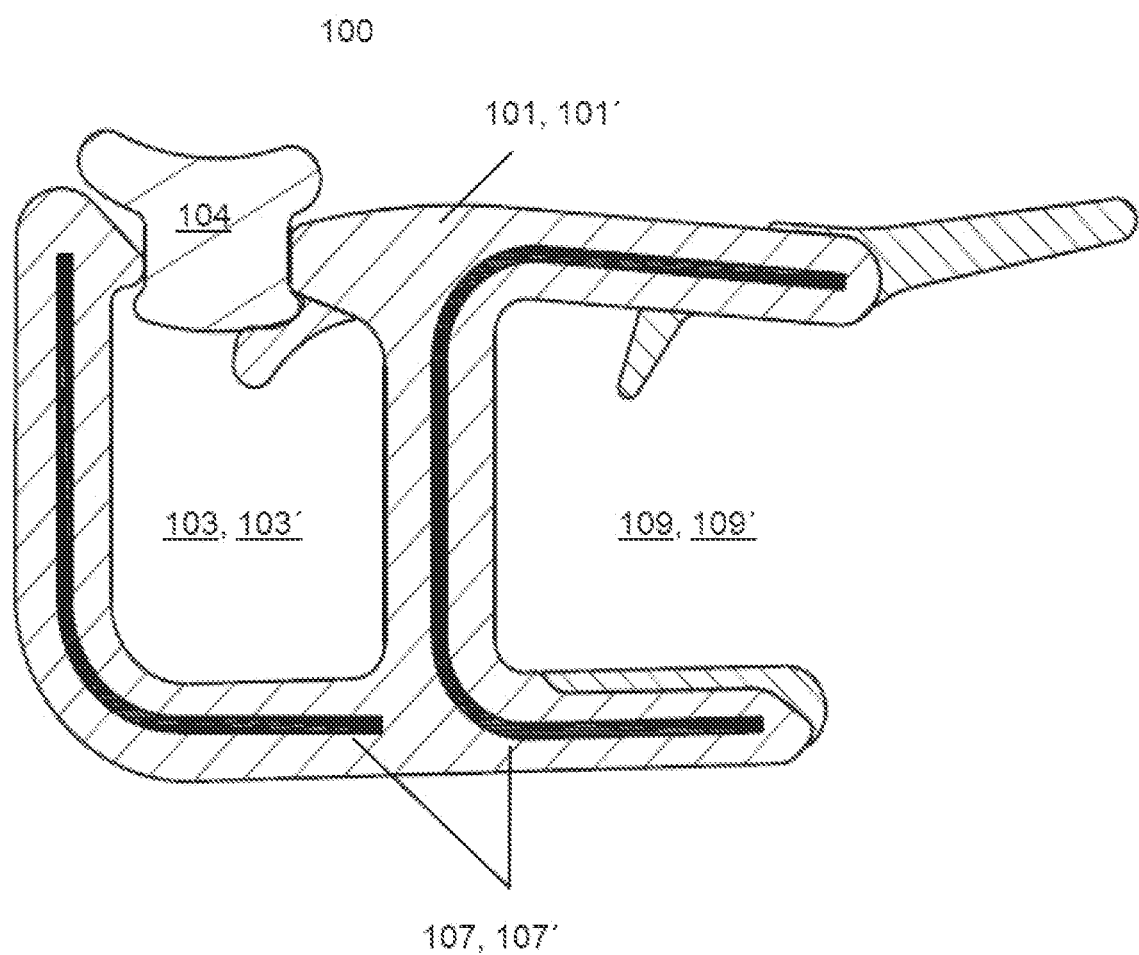
FIG. 7 shows an embodiment of the cross section which is alternative to that of FIG. 5.

FIG. 7 shows an alternative embodiment of a cross section for strip assembly 100. This cross section describes the cross section of strip section 100a of the strip assembly 100 shown in FIG. 2 and the cross sections of strip sections 100a and 100b of the strip assembly 100 shown in FIG. 4 as well as a preferred cross section of the strand section 100c shown in FIG. 1.

In addition to an approximately U-shaped latching recess 103, 103', preferably with an undercut on both sides, this embodiment also includes an approximately U-shaped windshield-side mounting groove 109, 109', preferably without an undercut, which mounting groove can be disposed along the edge of the windshield and embraces the windshield edge on both sides. The windshield-side opening of mounting groove 109, 109' is approximately perpendicular to the air-inlet-panel-side opening of latching recess 103, 103'. An engagement surface with a double-sided adhesive tape for adhesive attachment of the assembly along the edge of the windshield can here be dispensed with or is replaced by mounting groove 109, 109'. Apart from this, all other features of the invention are also realized here and denoted by the same reference numerals. Furthermore, reference is made to the description.

In all of the above-described and/or shown embodiments, profiled plastic strip 101, 101' may be made of different materials. In particular, sections extending along an opening in the vehicle body and/or along a vehicle window pane are, at least in some sections and/or areas, preferably realized using a plastic material having a lower Shore hardness than the Shore hardness of profiled plastic strip 101, 101' and/or than the Shore hardness of latching recess 103, 103'. The embodiments shown may preferably be produced by a coextrusion process. Alternatively, it would be conceivable to use a 3D printing process or to use both manufacturing processes simultaneously. Other processes which preferably allow the strip assembly components to be produced in one piece as a continuous strand are also applicable and recommended.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

TABLES 1

| | |
|---|---|
| 100 | strip assembly |
| 100a | first strip section |
| 100b | second strip section |
| 100c | strand section |
| 100d | profiled strip strand |
| 101 | (first) profiled plastic strip |
| 101' | second profiled plastic strip; end section |
| 102, 102' | engagement surface |
| 103, 103' | latching recess |
| 104 | protective plastic strip |
| 104a | protective strip strand |
| 105 | protective film of the adhesive tape |
| 106, 106' | adhesive tape |
| 107, 107' | core of the profiled strip |
| 108 | predetermined fracture line, punch cut, cut |

TABLES 1-continued

| | |
|---|---|
| 109, 109' | mounting groove |
| 110 | boundary/transition region (between strip sections 100a and 100b), processing region |
| 111 | windshield |

The invention claimed is:

1. A strip assembly comprising:
   a profiled plastic strip including a latching recess configured to receive a mounting rib of an air inlet panel; and
   a single-piece protective plastic strip which is mechanically releasably latched in the latching recess at least in some sections along the profiled plastic strip,
   wherein the strip assembly includes a first and a second strip section, the profiled plastic strip being configured such that the profiled plastic strip extends only along the first strip section, and the protective plastic strip being configured such that it extends along both the first and the second strip sections.

2. The strip assembly according to claim 1, further comprising a second profiled plastic strip having a latching recess, the second profiled plastic strip extending only along the second strip section, wherein the protective plastic strip is also latched in the latching recess of the second profiled plastic strip at least in some sections along the second profiled plastic strip.

3. The strip assembly according to claim 1, further comprising a double-sided adhesive tape including a first adhesive surface and a second adhesive surface, the second adhesive surface being covered by a protective film of the adhesive tape, wherein the profiled plastic strip includes an engagement surface configured for engagement along an edge of a windshield, wherein the adhesive tape is bonded to the engagement surface by the first adhesive surface, and wherein the protective film extends along both the first and the second strip sections.

4. The strip assembly according to claim 1, wherein one end of the profiled plastic strip has a predetermined fracture line or a punch-cut line substantially transverse to a longitudinal extent of the profiled plastic strip.

5. The strip assembly according to claim 1, wherein the profiled plastic strip includes a core which extends along the profiled plastic strip and is plastically deformable.

6. A windshield comprising the strip assembly according to claim 1.

7. A vehicle comprising a windshield and the strip assembly according to claim 1.

8. A method for producing a strip assembly, the method comprising:
   providing a profiled strip strand having a latching recess configured to receive a mounting rib of an air inlet panel, and providing a protective strip strand which is mechanically releasably latched in the latching recess at least in some sections along the profiled strip strand; and
   dividing the profiled strip strand into two sections in a processing region, the protective strip strand remaining in one piece.

9. The method according to claim 8, wherein prior to or subsequent to dividing the profiled strip strand into the two sections, a strand section including the processing region is severed from the profiled strip strand and from the protective strip strand.

10. The method according to claim 8, wherein a predetermined fracture line is provided in the processing region.

11. The method according to claim 8, wherein a cut through a material of the profiled strip strand is provided in the processing region.

12. The method as recited in claim 11, wherein the cut through the material is made by a profiled punching knife.

13. The method according to claim 8, wherein during the dividing the profiled strip strand into the two sections, an end section is separated from the profiled strip strand.

14. The method according to claim 8, wherein the profiled strip strand includes an engagement surface configured for engagement along an edge of a windshield, and wherein a double-sided adhesive tape is provided, the adhesive tape including a first adhesive surface and a second adhesive surface, the second adhesive surface being covered by a protective film of the adhesive tape, the adhesive tape being bonded to the engagement surface by the first adhesive surface prior to the dividing the profiled strip strand into the two sections, and, during the dividing the profiled strip strand into the two sections, the adhesive tape being cut through in such a way that the protective film remains in one piece.

15. A method for mounting an air inlet panel to a windshield, the method comprising:
   providing the strip assembly according to claim 1;
   using a section of the protective plastic strip that extends along the second strip section as a grasping means to remove the protective plastic strip from the latching recess before the mounting rib of the air inlet panel is latched into latching recess.

16. The strip assembly according to claim 1, wherein the first and the second strip section of the strip assembly extend along a longitudinal extent of the strip assembly, the profiled plastic strip extending from a first end of the first strip section to a second end of the first strip section that is adjacent to a first end of the second strip section, and the protective plastic strip extending from the first end of the first strip section to a second end of the second strip section that is opposite to the first end of the second strip section.

17. The strip assembly according to claim 5, wherein the profiled plastic strip is arcuately curved at least in some sections along a longitudinal extent of the profiled plastic strip.

18. The method according to claim 8, wherein the dividing the profiled strip strand into the two sections is performed transverse to a longitudinal extent of the profiled strip strand such that the protective strip strand extends in one piece along both of the two sections and across a transition region between the two sections along the longitudinal extent of the profiled strip strand.

19. The method according to claim 18, wherein the protective strip strand remains latched in the latching recess on each side of the two sections after the dividing the profiled strip strand into the two sections.

20. The method according to claim 13, wherein the end section comprises one of the two sections of the profiled strip strand and is removed such that the protective strip strand remains and extends across both of the two sections in one piece.

* * * * *